(12) United States Patent
te Grotenhuis et al.

(10) Patent No.: US 8,495,368 B1
(45) Date of Patent: Jul. 23, 2013

(54) METHOD TO CREATE A CONTENT MANAGEMENT RECOMMENDATION BASED ON PRESENCE OF CONFIDENTIAL INFORMATION IN CONTENT

(75) Inventors: Markus te Grotenhuis, San Francisco, CA (US); Pushkar Tiwari, Fremont, CA (US); Shree Raman, San Francisco, CA (US); Stefano Paoletti, Oakland, CA (US); Dinesh Coca, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 195 days.

(21) Appl. No.: 13/048,866

(22) Filed: Mar. 15, 2011

(51) Int. Cl.
*H04L 29/06* (2006.01)
*H04L 29/08* (2006.01)

(52) U.S. Cl.
CPC .... *H04L 29/06863* (2013.01); *H04L 29/08729* (2013.01)
USPC .......................................... 713/166; 713/167

(58) Field of Classification Search
None
See application file for complete search history.

(56) References Cited

PUBLICATIONS

Improve Data Protection Processes with Content Discovery, Monitoring and Filtering. Olzak, Tom. Nov. 2007.*
Using Logical Data Protection and Recovery to Improve Data Availability. Hu, Wei. Springer-Verlag 2005.*

* cited by examiner

*Primary Examiner* — Venkat Perungavoor
(74) *Attorney, Agent, or Firm* — Lowenstein Sandler LLP

(57) ABSTRACT

Content to be scanned for confidential information may be identified. A determination is made if the content includes confidential information. The determination may be based on at least one data loss prevention policy. When the content includes confidential information, a content management recommendation is created. The content management recommendation may comprise at least one of a recommendation pertaining to a storage of the content and a recommendation pertaining to a backup of the content. The content management recommendation may be provided to a content management system.

15 Claims, 6 Drawing Sheets

METHOD TO CREATE A CONTENT MANAGEMENT RECOMMENDATION BASED ON PRESENCE OF CONFIDENTIAL INFORMATION IN CONTENT

FIELD OF INVENTION

Embodiments of the invention relate to managing content, and more particularly to creating a content management recommendation based on the presence of confidential information in the content.

BACKGROUND OF THE INVENTION

Managing content is essential for compliance with corporate policies and government regulations. Conventional content management tools have relied on manual intervention or business rules to manage the content. However, these conventional content management tools are not content aware and treat all content the same way. Treating all content the same may cause mismanagement of the content, thereby increasing storage costs, delayed access of information, lawsuits due to lost or incorrect reporting of information, and increased information technology (IT) and legal staff expenses.

SUMMARY OF THE INVENTION

A method and apparatus for creating a content management recommendation based on the presence of confidential information in content is described. In an exemplary method of one embodiment, content to be scanned for confidential information is identified. A determination is made if the content includes confidential information. The determination is based on at least one data loss prevention policy. When the content includes confidential information, a content management recommendation is created. The content management recommendation comprises at least one of a recommendation pertaining to a storage of the content and a recommendation pertaining to a backup of the content. The content management recommendation is provided to a content management system.

In some embodiments, the recommendation is created based on a type of the content management tool. In some embodiments, when the type of the content management tool is a storage type, creating the recommendation based on the type of the content management tool comprises creating the recommendation to assign one or more high tiers in a storage system to store the confidential information. In some embodiments, when the type of the content management tool is a backup type, creating the recommendation based on the type of the content management tool comprises determining whether the content management tool is to perform a backup of the content or a recovery of the content and when the content management tool is to perform the backup of the content, creating a recommendation to backup the confidential information included in the content, and when the content management tool is to perform the recovery of the content, creating a recommendation to restore the confidential information included in the content prior to restoring non-confidential information included in the content.

In some embodiments, the recommendation to backup the confidential information comprises backing up the confidential information included in the content at a higher rate than backing up non-confidential information included in the content. In some embodiments, the recommendation to backup the confidential information comprises hacking up the confidential information in the content to a secure backup location accessible to the content records management tool without backing up the non-confidential information included in the content. In some embodiments, the recommendation to backup the confidential information comprises backing up the confidential information in the content to a tape accessible to the content management tool. In some embodiments, the recommendation to backup the confidential information comprises a retention period for the confidential information. In some embodiments, the recommendation to backup the confidential information comprises encrypting the confidential information prior to storing the confidential information.

In addition, a computer readable storage medium for creating a content management recommendation based on the presence of confidential information in content is described. An exemplary computer readable storage medium provides instructions, which when executed on a processing system causes the processing system to perform a method such as the exemplary methods discussed above.

Further, a system for creating a content management recommendation based on the presence of confidential information in content is described. An exemplary system may include a memory and a processor coupled with the memory. In some embodiments of the exemplary system, the processor is to identify content to be scanned for confidential information. The processor is to make a determination if the content includes confidential information. The determination is based on at least one data loss prevention policy. When the content includes confidential information, the processor is to create a content management recommendation. The content management recommendation comprises at least one of a recommendation

BRIEF DESCRIPTION OF THE DRAWINGS

The present invention will be understood more fully from the detailed description given below a from the accompanying drawings of various embodiments of the invention, which, however, should not be taken to limit to the invention to the specific embodiments, but are for explanation and understanding only.

DETAILED DESCRIPTION OF THE PRESENT INVENTION

A method and apparatus for creating a content management recommendation based on the presence of confidential information in content is described. In an exemplary method of one embodiment, content to be scanned for confidential information is identified. A determination is made if the content includes confidential information. When the content includes confidential information, a content management recommendation is created.

In the following description, numerous details are set forth. It will be apparent, however, to one of ordinary skill in the art having the benefit of this disclose, that embodiments of the present invention may be practiced without these specific details.

Figure 1:
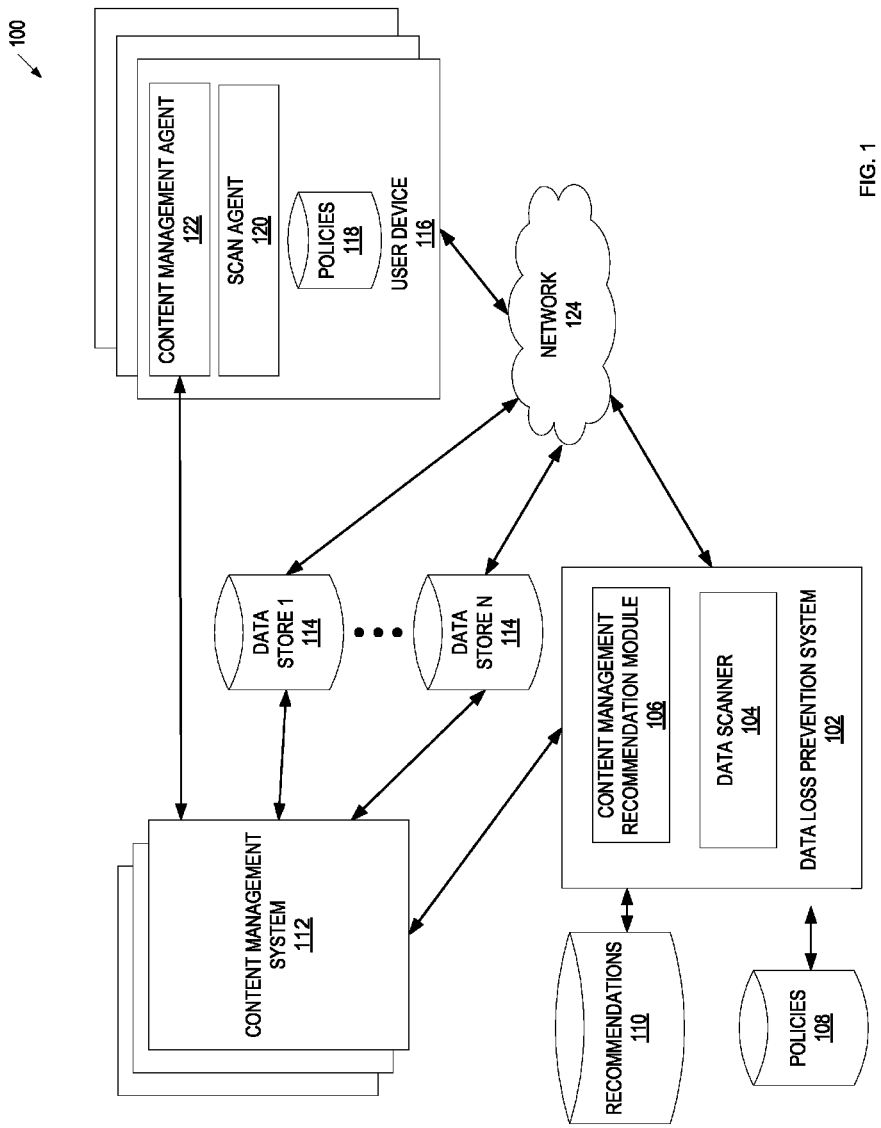
FIG. 1 illustrates an exemplary network architecture in which embodiments of the invention may operate.

FIG. 1 is a block diagram of an exemplary network architecture 100, in which embodiments of the present invention may operate. The network architecture 100 may include a data loss prevention system 102, one or more content management systems 112, and one or more user devices 116 coupled via a network 124 (e.g. public network such as the Internet or private network such as a local area network (LAN)). The user devices 116 may include personal computers, laptops, PDAs, mobile phones, network appliances, etc. The data loss prevention system 102 may be hosted by one or more computer systems such as servers, routers, desktop computers, etc.

The data loss prevention system 102 and the content management system 112 may reside on the same or different machines (e.g., a server computer system, a gateway, a personal computer, etc.). They may run on one Local Area Network (LAN) and may be incorporated into the same physical or logical system, or different physical or logical systems.

Alternatively, the data loss prevention system 102 and the content management system 112, and user devices 116 may reside on different LANs that may be coupled together via the Internet but separated by firewalls, routers, and/or other network devices. In yet another configuration, the data loss prevention system 102 lay reside on a server, or different servers, coupled to other devices via a public network (e.g., the Internet) or a private network (e.g., LAN). It should be noted that various other network configurations can be used including, for example, hosted configurations, distributed configurations, centralized configurations, etc.

In some embodiments, the data loss prevention system 102 includes a content management recommendation module 106. In some embodiments, the data loss prevention system 102 and the content management recommendation module 106 are different systems.

The network architecture 100 further includes data stores 114 coupled to the network 124. The data stores 114 may represent a single or multiple data structures (databases, repositories, files, etc.) residing on one or more mass storage devices, such as magnetic or optical storage based disks, tapes, or hard drives. The data stores 114 may store any kind of electronic data, or records, pertaining to the operation of an organization including entails, shared workspaces, etc. The data stores 114 can be centralized data repositories that may contain confidential electronic records. The data stores 114 may be, for example, part of a network-attached storage (NAS) system or a storage area network (SAN) system.

Data loss prevention system 102 protects confidential information maintained by an organization. Confidential information may be stored in a structured form such as a database, a spreadsheet, etc., and may include, for example, customer, employee, patient or pricing data. In addition, confidential information may include unstructured data such as design plans, source code, CAD drawings, financial reports, human resources reports, customer or patient reports, pricing documentation, corporate mergers and acquisitions documentation, government (e.g. Securities and Exchange Commission) filings, and any other confidential information that requires restricted user access. The data loss prevention system 102 protects confidential information using one or more data loss prevention (DLP) policies. A DLP policy includes rules for scanning content to detect the presence of confidential information. The content to be scanned may be stored in centralized data repositories such as data stores 114 that may potentially contain documents with confidential information and/or database data including confidential information. In addition, the content to be scanned may include documents associated with a client device such as user device 116. Documents associated with a user device 116 may include documents or electronic records stored locally on user device 116 and network-based documents or electronic records stored for user device 116 (e.g., as part of NAS or SAN system). A document can be a file, a message, a web request or any other data item that is stored on a storage medium and is accessible using a name or any other identifier.

Data loss prevention system 102 may also instruct scan agents 120 located on one or more of the user devices 116 to scan documents stored locally for confidential information. Data loss prevention system 102 may do this according to one or more of the DLP policies 118.

When monitoring content for the presence of confidential information, the data loss prevention system 102 may not use the actual source data (the actual confidential information) but rather fingerprints of the source data, to avoid exposing the confidential information and to facilitate more efficient searching of the content. Fingerprints may include hashes of source data, encrypted source data, or any other signatures uniquely identifying the source data. The data loss prevention system 102 may distribute fingerprints to scan agents 120, and scan agents 120 may use fingerprints when scanning documents for confidential information in accordance with one or more DLP policies 118. Data scanner 104 in the data loss prevent system 102 may use fingerprints when scanning documents confidential information in accordance with one or more DLP policies 108.

A policy may include a set of rules that specify what confidential information needs to be present in the documents being scanned in order to trigger a policy violation. In addition, policies may specify when particular documents should be scanned, which documents should be scanned, etc. Further, policies may specify which actions should be taken when the documents being scanned contain confidential information. For example, the policy may require that access to the content be blocked, reported, etc. Data loss prevention system 102 creates DLP policies 108 (e.g., based on user input or based on relevant regulations and distributes relevant DLP policies to various entities. For example, DLP policies 118 pertaining to scanning content stored on user devices 116 are distributed to user devices 116. DLP policies 108 pertain to scanning content stores scanning data stores 114.

An organization may maintain multiple data stores 114 and may store a large number of data objects, e.g., documents, in each data store 114. The stored data objects may be frequently modified by different employees of the organization and new data objects may be often added to the data stores 114. Hence, DLP policies 104 may request that data stores 114 be scanned frequently to prevent loss of confidential information.

Content management system 112 can manage content in centralized data repositories such as data stores 114. Content management system 112 may also instruct content management agents 122 located on one or more of user devices 116 to manage content stored locally. In one embodiment, the type of content management system 112 is a backup system. In this embodiment, content management system 112 may backup content to a data repository, such as data stores 114. In this embodiment, content management system 112 may restore data from a data repository, such as data store 114. In an alternate embodiment, the type off content management system 112 is a storage system. In this embodiment, content management system 112 may store to a data repository, such as data store 114. In this embodiment, be data repository may include different tiers. A higher tier, such as a hard drive, may include a higher level of security, clustering, and/or more frequent backup of data. A lower tier, such as an optical disk or tape, may include less security, clustering, and/or less frequent backup of data.

Data loss prevention system 102 may include a content management recommendation module 106. In one embodiment, a DLP policy violation a scanned data object triggers an incident. In some embodiments, when an incident is triggered, data loss prevention system 102 can create a content management recommendation for the content. In one embodiment, data loss prevention system 102 can create a content management recommendation for the content when data loss prevention system 102 detects confidential information in content during a scan of the content. In some embodiments, when an incident is triggered, a content management system 112 requests a content management recommendation for the content which triggered the incident. In some embodiments, when content, such as a file or document, is created or modified in data stores 114 data loss prevention system 102 detects the creation or modification and triggers a recommendation for the content. In some embodiments, a request for a content management recommendation may include a type of content management system 112. In some embodiments, the content management recommendation can be based on a type of the content management system 112 that manages the content. In some embodiments, a content management recommendation request may include content associated with content management system 112. In some embodiments, a content management recommendation can be requested at predefined times. In some embodiments, content management recommendation module 106 may send the content management recommendation to content management system 112. In some embodiments, the content management recommendation may be stored in recommendations 110.

Figure 2:
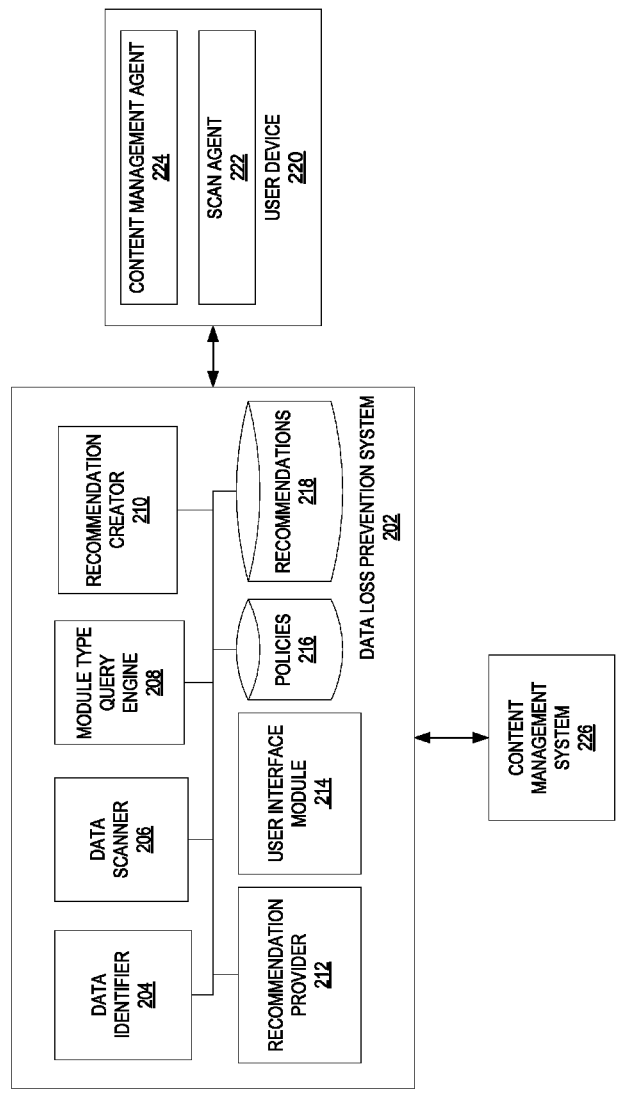
FIG. 2 is a block diagram of one embodiment of a data loss prevention system including a recommendation module.

FIG. 2 is a block diagram of one embodiment of a system 200. The system 200 may include a data loss prevention system 202, a user device 220, and a content management system 226. The components of the system 200 may represent modules that can be combined together or separated into further modules, according to some embodiments.

Data loss prevention system may include a data identifier 204, a data scanner 206, a module type query engine 208, a recommendation creator 210, a recommendation provider 212, a user interface creator 214, policies 216, and recommendations 218. The components of the data loss prevention system 202 may represent modules that can be combined together or separated into further modules, according to some embodiments.

The data identifier 204 may identify data objects, or documents, that are to be scanned for confidential information. In some embodiments, the data objects to be scanned may be part of a centralized data repository and are to be scanned over a network. In some embodiments, data identifier 204 may receive a request to scan the data objects from a scan agent 222 in user device 220 in accordance with one or more DLP policies. In other embodiments, data identifier 204 may receive a request to scan the data objects from a content management system 226 in accordance with one or more DLP policies. The data to be scanned may be one or more directories of documents, part of a directory of documents, etc.

Data scanner 206 may scan data objects that data identifier 204 has identified to be scanned. In some embodiments, data scanner 206 can scan the data for confidential information using fingerprints of data that have been classified as containing confidential information. In one embodiment, data scanner 206 may scan the data objects in accordance with at least one DLP policy. Data scanner 206 may retrieve the DLP policy from policies 216.

Module type query engine 208 may determine a type of content management system 226. In one embodiment, nodule type query engine 208 receives a type of content management system 226 with a content management recommendation request from content management system 226. In an alternate embodiment, module type query engine 208 may determine a type of content management system 226 by submitting a query to content management system 226. In one embodiment, module type query engine 208 may receive an action to be performed by the content management system 226. In some embodiments, a type of content management system 226 is not included in the request because content management system 226 can only be one type of system (e.g., only a backup system). In these embodiments, module type query engine 208 may not be included in data loss prevention system 202.

Recommendation creator 210 may create a content management recommendation based on information received from data scanner 206. In some embodiments, recommendation creator 210 may create the content management recommendation based also on the type of content management system 226 received from module type query engine 208. If recommendation creator 210 receives a determination from data scanner 206 that content associated with content management system 226 includes confidential information, recommendation creator 210 creates a content management recommendation. In some embodiments, the content management recommendation can be based on the type of content management system 226 received from module type query engine 208. In some embodiments, the content management recommendation includes a recommendation for a backup system and a storage system, any other system requested by a user using user interface module 214.

If the type of content management system 226 is a storage system, recommendation creator 210 can create a content management recommendation to store confidential information included in the content in higher tiers of storage in data stores accessible to the content management system 226. In one embodiment, the higher tiers of storage in the data stores can include a higher level of security, clustering, and/or more frequent backup of the data in the data stores than lower tiers of storage in the data stores.

In one embodiment, if the type of content management system 226 is a backup system, recommendation creator 210 can determine a type of action that management system 226 is to perform. For example, the type of action may be a backup of data or a recovery of data. In one embodiment, recommendation creator 210 can make this determination using information sent in the content management recommendation request from content management system 226. In an alternate embodiment, recommendation creator 210 can receive the type of action to be performed from module type query engine 208. In another alternate embodiment, recommendation creator 210 can send a query to content management system 226 to obtain the type of action to be performed. In another alternate embodiment, recommendation creator 210 does not know whether content management system 226 is to perform a backup of data in the data stores or a recovery of data. In this embodiment, recommendation creator 210 creates a recommendation including information for both a backup of data and a recovery of data. In yet another alternate embodiment, recommendation creator 210 can receive the type of action to be performed from user interface module 214.

If content management system 226 is to perform a backup of data, recommendation creator 210 can create a content management recommendation to backup confidential information in the content more frequently than non-confidential information in the content or in the data stores (e.g., every day versus every week), backup the confidential information to a highly secure backup location (e.g., offsite location), retain the confidential information for a retention period (e.g., one week, one month, etc.), encrypt the confidential information prior to storing the confidential information, and/or backup the confidential information to a tape accessible to user device 220. If the content management system 226 is to perform a recovery of data, recommendation creator 210 can create a content management recommendation to restore confidential information in the content prior to non-confidential information in the content.

In one embodiment, if recommendation creator 210 receives a determination from data scanner 206 that content associated with content management system 226 does not include confidential information, recommendation creator 210 can create a predetermined recommendation. In one embodiment, the predetermined recommendation can be empty. In an alternate embodiment, the predetermined recommendation can include a statement that there is no confidential information in the content. In an alternate embodiment, the predetermined recommendation can include a recommendation to apply a default policy to the content. For example, the default policy may be a default retention policy for content management system 226 which can be applied indefinitely or until a user or group quota is reached. In another alternate embodiment, if recommendation creator 210 receives a determination from data scanner 206 that content associated with content management system 226 does not include confidential information, recommendation creator 210 may not create a content management recommendation for the content.

In one embodiment, once a content management recommendation has been created by recommendation creator 210, the recommendation provider 212 may transmit the recommendation to content management system 226. In an alternate embodiment, the recommendation provider 212 can store the content management recommendation in a data repository for content management system 226 to retrieve at predefined tunes.

User interface module 214 can display a user interface to a user and allow the user to configure the actions to be performed by the data loss prevention system. In some embodiments, user interface module 214 can include one or more actions to be performed by content management system 226. In some embodiments, user interface module 214 provides the one or more actions to be performed to recommendation creator 210. In some embodiments, user interface module 214 can include one or more options for creation of the recommendation, such as default policies, quotas, retention periods, etc.

Figure 3:
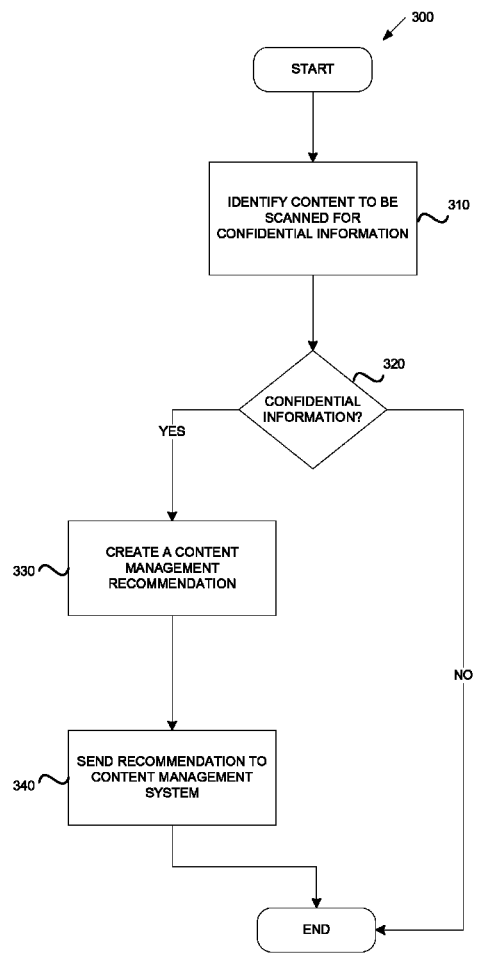
FIG. 3 is a flow diagram of one embodiment of a method for creating a recommendation to send to a content management tool.

FIG. 3 is a flow diagram of one embodiment of a method 300 for creating a recommendation to send to a content management tool. The method 300 is performed by processing logic that may comprise hardware (circuitry, dedicated logic, etc.), software (such as is run on a general purpose computer system or a dedicated machine), or a combination of both. In one embodiment, the method 300 is performed by a data loss prevention system (e.g., data loss prevention system 102 of FIG. 1 or data loss prevention system 202 of FIG. 2).

Referring to FIG. 3, processing logic identifies content to scan for confidential information at step 310. In some embodiments, when an incident is triggered, a data loss prevention system can create a content management recommendation for the content. In some embodiments, when an incident is triggered, a content management system provides a request for a content management recommendation for the content which triggered the incident. In these embodiments, the content management system can identify the content to scan for confidential information. In some embodiments, when content, such as a file or document, is created or modified in a central repository, a data loss prevention system detects the creation or modification and triggers the creation of a content management recommendation for the content.

In some embodiments, a request for a content management recommendation may include a type of the content management system. In some embodiments, the content management recommendation can be based on the type of the come, a management system that manages the content. In some embodiments, a content management recommendation request may include content to scan. In some embodiments, a content management recommendation can be requested at predefined times. In some embodiments, the content management recommendation request can include a type of action to be performed by a content management system. In some embodiments, a type of action to be performed by the content management system can be user selected. In some embodiments, the user selection can be made in a user interface.

At step 320, a determination is made if confidential information is included in the identified content to be scanned. The identified content to scan may be associated with a user device running the content management agent or reside in a centralized data repository. In some embodiments, the identified content may be scanned to determine if the content contains confidential information. In some embodiments, the content may be scanned in accordance with one or more DLP policies. In some embodiments, the content is scanned for confidential information using fingerprints of content that has been classified as containing confidential information. In one embodiment, the content may be an electronic record. If the content includes confidential information, processing logic proceeds to step 330. In some embodiments, if no confidential information is included in the content, a predetermined recommendation is created. In one embodiment, the predetermined recommendation can be empty. In an alternate embodiment, the predetermined recommendation can include a statement that no confidential information exists in the content. If the content does not include confidential information, the method 300 ends.

At step 330, a recommendation is created. In some embodiments, the recommendation is created based on the DLP policy or policies violated by the content. In some embodiments, the recommendation is created based on a type of the content management system. In one embodiment, the type of the content management system can be provided in the request from be content management system. In an alternate embodiment, the type of the content management system can be obtained by submitting a query to the content management system. In another alternate embodiment, the type of the content management system can be unknown. In some embodiments, if the type of the content management system is unknown, a predetermined recommendation is created. In some embodiments, a user-defined recommendation can be created based on user input. In one embodiment, the predetermined recommendation can include a recommendation for both a backup system and a storage system. One embodiment of a method for creating the recommendation based on the type of the content management system is further described below in conjunction with FIG. 4.

At step 340, the content management recommendation is sent to the content management system. In one embodiment, once a content management recommendation has been created, the content management recommendation can be transmitted to the content management system over a network. In an alternate embodiment, the content management recommendation can be stored in a data repository accessible to the content management system.

Figure 4:
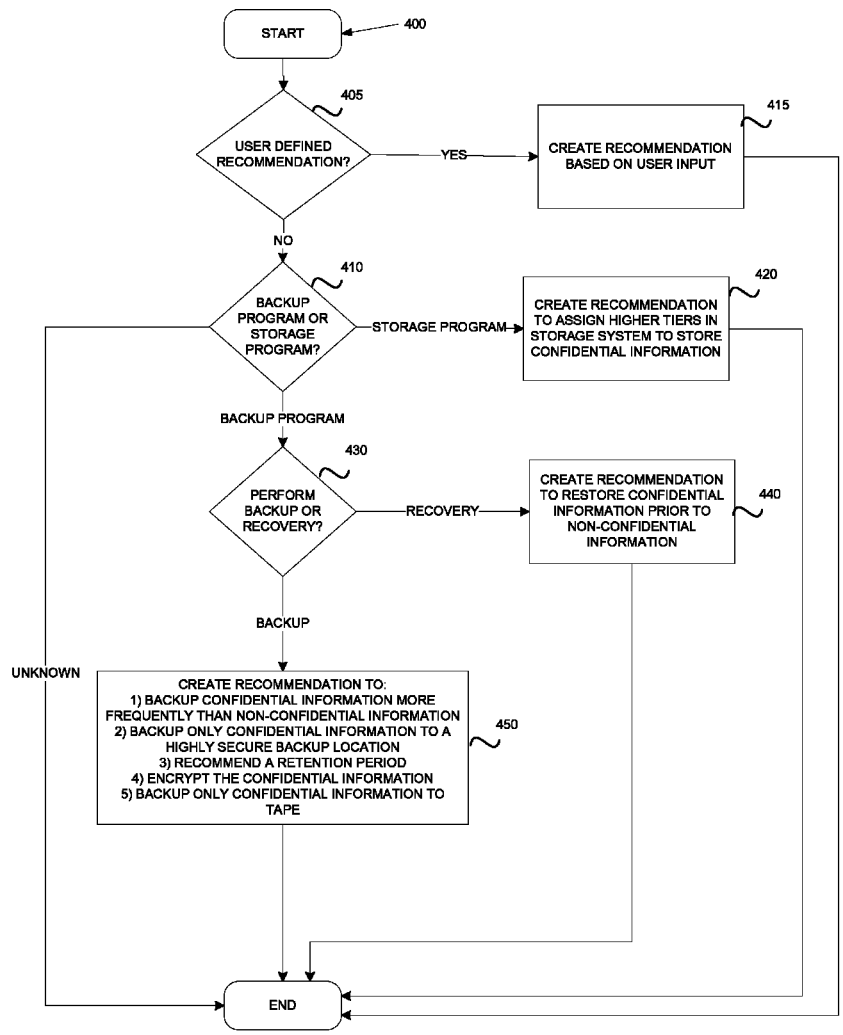
FIG. 4 is a flow diagram of one embodiment of a method for creating a recommendation based on a type of the content management tool.

FIG. 4 is a flow diagram of one embodiment of a method 400 for creating a recommendation based on a type of the content management system. The method 400 is performed by processing logic that may comprise hardware (circuitry, dedicated logic, etc.), software (such as is run on a general purpose computer system or a dedicated machine), or a combination of both. The method 400 may be performed by a recommendation module (e.g., content management recommendation module 106 of FIG. 1 or recommendation creator 210 of FIG. 2).

Referring to FIG. 4, processing logic begins by determining if the recommendation is user-defined at block 405. If the recommendation is user-defined, the method 400 proceeds to step 415. If the recommendation is not user-defined, the method 400 proceeds to step 410.

At step 410, processing logic determines the type of the content management system. In one embodiment, the type of the content management system can be provided in the request from the content management system. In an alternate embodiment, the type of the content management system can be obtained by submitting a query to the content management system. In another alternate embodiment, the type of the content management system can be unknown. If the type of the content management system is a storage program, the method 400 proceeds to step 420. If the type of the content management tool is a backup program, the method 400 proceeds to step 430. If the type of the content management tool is unknown or is not a predetermined type, the method 400 ends.

At step 415, processing logic creates a recommendation based on user input. In some embodiments, a user can define the contents of the recommendation using a user interface. In some embodiments, the recommendation can include one or more default policies to use, quotas, retention periods, etc.

At step 420, processing logic creates a recommendation to assign higher tiers of storage in data stores to store confidential information included in content accessible to the content management system. In one embodiment, the higher tiers of storage in the data stores can include a higher level of security, clustering, and/or more frequent backup of stored data than lower tiers of storage in the data stores. It may be desirable to have confidential information in the higher tiers of storage such that the confidential information has these benefits of the higher tiers of storage.

At step 430, processing logic determines the type of action the content management system which is a backup program, should perform. In some embodiments, the type of action to be performed is a backup of data or a recovery of data. In one embodiment, processing logic makes this determination by extracting the action being performed by the content management system from the request sent from the content management system. In an alternate embodiment, processing logic makes this determination by sending a request to the content management system to obtain the action being performed. In another alternate embodiment, processing logic makes this determination using user input from a user interface. If the action being performed by the content management system is a recovery action, the method proceeds to step 440. If the action being performed by the content management system is a backup action, the method proceeds to step 450. If the action being performed by the content management system is unknown, steps 440 and 450 may be combined and a content management recommendation is created that includes a recommendation for both the backup of data and the recovery of data.

At step 440, a content management recommendation is created to recommend that the recovery of the content restore confidential information in the content prior to the restoring of non-confidential information in the content. In some embodiments, the content management recommendation may also include information about the content and the type of action to be taken.

At step 450, a content management recommendation is created to backup confidential information in the content more frequently than non-confidential information in the content or in the data stores (e.g., every day versus every week), backup only confidential information to a highly secure backup location (e.g., offsite location), recommend a retention period, encrypt the confidential information, and/or backup only confidential information to a tape accessible to the client running the content management system. In some embodiments, the content management recommendation may also include information about the content and the type of action be taken. It some embodiments, the DLP policy used to determine whether confidential information exists in the content is used to recommend the retention period for the content. In one embodiment, the retention period for the confidential information is longer than the retention period for the non-confidential information (e.g., one month vs. one week).

Figure 5:
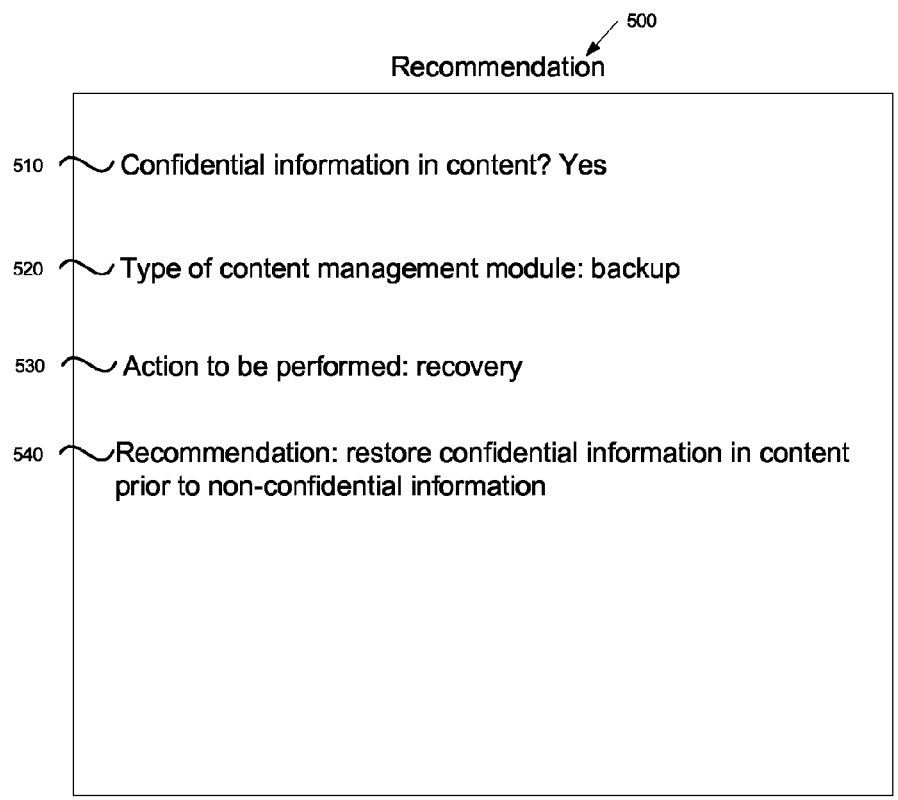
FIG. 5 illustrates an exemplary recommendation in accordance with one embodiment of the invention.

FIG. 5 illustrates an exemplary content management recommendation for a content management system. Recommendation 500 may include a field 510 indicating whether confidential information exists in content associated with the content management system. Content management recommendation 500 may include a field 520 indicating a type of the content management system on which the recommendation was based upon. Content management recommendation 500 may include a field 530 indicating a type of action to be performed by the content management system on which the content management recommendation was based upon. Content management recommendation 500 may include a field 540 indicating one or more content management recommendations for the content.

Figure 6:
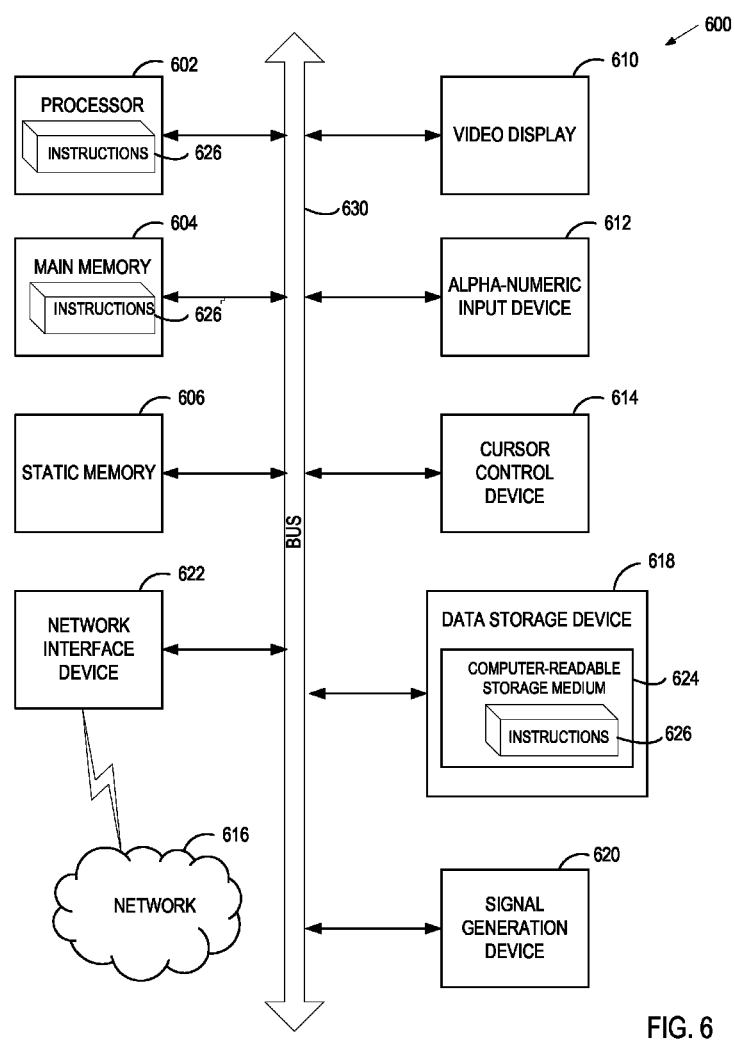
FIG. 6 is a block diagram of an exemplary computer system that may perform one or more of the operations described herein.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 represents may also be one or more special-purpose processing devices such as an application specific integrated circuit (ASIC), a field programmable gate array (FPGA), a digital signal processor (DSP), network processor, or the like. Processor 602 represents is configured to execute instructions 626 (e.g., processing logic) for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a computer-readable medium 624 on which is stored one or more sets of instructions (e.g., software 626) embodying any one or more of the methodologies or functions described herein. The software 626 may also reside, completely or at least partially, within the main memory 604 and/or within the processor 602 during execution thereof by the computer system 600, the main memory 604 and the processor 602 also constituting computer-readable media. The software 626 may further be transmitted or received over a network 616 via the network interface device 622.

While the computer-readable medium 624 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable medium" accordingly be taken to include, but not be limited to, solid-state memories, optical media, and magnetic, media.

In the above description, well-known structures and devices are shown in block diagram form, rather than in detail, in order to avoid obscuring the present invention. Some portions of the description are presented in terms of algorithms and symbolic representations of operations on data bits within a computer memory. These algorithmic descriptions and representations are the means used by those skilled in be data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as hits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "applying", "refraining", "scanning", "updating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer selectively activated or reconfigured by a computer program stored in the computer. As discussed above, such a computer program may be stored in a computer-readable medium.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:
    identifying, by a data loss prevention system, content to be scanned for confidential information, wherein the content is associated with a content management system;
    determining, by the data loss prevention system, whether the content includes confidential information, the determining being based on at least one data loss prevention policy;
    when the content includes confidential information, creating, by the data loss prevention system, a content management recommendation based on a type of the content management system, the content management recommendation comprising at least one of a recommendation pertaining to a storage of the content and a recommendation pertaining to a backup of the content, wherein when the type of the content management system is a storage type, creating the content management recommendation based on the type of the content management system comprises creating the content management recommendation to comprise the recommendation pertaining to the storage of the content, wherein the recommendation pertaining to the storage of the content comprises an assignment of one or more high tiers in a storage system to store the confidential information; and providing, by the data loss prevention system, the content management recommendation to the content management system.

2. The method of claim 1, wherein creating the content management recommendation based on the type of the content management system comprises:
when the type of the content management system is a backup type,
determining whether the content management system is to perform a backup of the content or a recovery of the content,
when the content management system is to perform the backup of the content, creating the content management recommendation to comprise the recommendation pertaining to the backup of the content, wherein the recommendation pertaining to the backup of the content comprises a backup of the confidential information included in the content, and
when the content management system is to perform the recovery of the content, creating the content management recommendation to comprise the recommendation pertaining to the backup of the content, wherein the recommendation pertaining to the backup of the content comprises restoring the confidential information included in the content prior to restoring non-confidential information included in the content.

3. The method of claim 2, wherein the backup of the confidential information comprises backing up the confidential information included in the content at a higher rate than backing up non-confidential information included in the content.

4. The method of claim 2, wherein the backup of the confidential information comprises backing up the confidential information in the content to a secure backup location accessible to the content management system without backing up the non-confidential information included in the content.

5. The method of claim 2, wherein the backup of the confidential information comprises backing up the confidential information in the content to a tape accessible to the content management system.

6. The method of claim 2, wherein the backup of the confidential information comprises a retention period for the confidential information.

7. The computer-implemented method of claim 2, wherein the backup of the confidential information comprises encrypting the confidential information prior to storing the confidential information.

8. A non-transitory computer readable storage medium including instructions that, when executed by a computing device, cause the computing device to perform operations comprising:
identifying, by a data loss prevention system, content to be scanned for confidential information, wherein the content is associated with a content management system;
determining if the content includes confidential information, the determining being based on at least one data loss prevention policy;
when the content includes confidential information, creating a content management recommendation based on a type of the content management system, the content management recommendation comprising at least one of a recommendation pertaining to a storage of the content and a recommendation pertaining to a backup of the content, wherein when the type of the content management system is a storage type, creating the content management recommendation based on the type of the content management system comprises creating the content management recommendation to comprise the recommendation pertaining to the storage of the content, wherein the recommendation pertaining to the storage of the content comprises an assignment of one or more high tiers in a storage system to store the confidential information; and
providing the content management recommendation to the content management system.

9. The non-transitory computer readable storage medium of claim 8, wherein creating the content management recommendation based on the type of the content management system comprises:
when the type of the content management system is a backup type,
determining whether the content management system is to perform a backup of the content or a recovery of the content,
when the content management system is to perform the backup of the content, creating the content management recommendation to comprise the recommendation pertaining to the backup of the content, wherein the recommendation pertaining to the backup of the content comprises a backup of the confidential information included in the content, and
when the content management system is to perform the recovery of the content, creating the content management recommendation to comprise the recommendation pertaining to the backup of the content, wherein the recommendation pertaining to the backup of the content comprises restoring the confidential information included in the content prior to restoring non-confidential information included in the content.

10. The non-transitory computer readable storage medium of claim 9, wherein the backup of the confidential information comprises backing up the confidential information included in the content at a higher rate than backing up non-confidential information included in the content.

11. The non-transitory computer readable storage medium of claim 9, wherein the backup of the confidential information comprises backing up the confidential information in the content to a secure backup location accessible to the content management system without backing up the non-confidential information included in the content.

12. The non-transitory computer readable storage medium of claim 9, wherein the backup of the confidential information comprises backing up the confidential information in the content to a tape accessible to the content management system.

13. The non-transitory computer readable storage medium of claim 9, wherein the backup of the confidential information comprises a retention period for the confidential information.

14. The non-transitory computer readable storage medium of claim 9, wherein the backup of the confidential information comprises encrypting the confidential information prior to storing the confidential information.

15. A system, comprising:
a memory; and
a processor coupled with the memory to
identify content to be scanned for confidential information, wherein the content is associated with a content management system;

determine if the content includes confidential information, the determining being based on at least one data loss prevention policy;

when the content includes confidential information, create a content management recommendation based on a type of the content management system, the content management recommendation comprising at least one of a recommendation pertaining to a storage of the content and a recommendation pertaining to a backup of the content, wherein when the type of the content management system is a storage type, creating the content management recommendation based on the type of the content management system comprises creating the content management recommendation to comprise the recommendation pertaining to the storage of the content, wherein the recommendation pertaining to the storage of the content comprises an assignment of one or more high tiers in a storage system to store the confidential information; and provide the content management recommendation to the content management system.

* * * * *